(12) United States Patent
Milner et al.

(10) Patent No.: US 7,354,057 B2
(45) Date of Patent: Apr. 8, 2008

(54) LASER GUIDED TRAILER ALIGNMENT SYSTEM

(76) Inventors: Gary Milner, BT-2 Box 54, Valliant, OK (US) 74764; Martin Talley, P.O. Box 573, Valliant, OK (US) 74764

( * ) Notice: Subject to any disclaimer, the term of this patent is extended or adjusted under 35 U.S.C. 154(b) by 335 days.

(21) Appl. No.: 11/136,241

(22) Filed: May 23, 2005

(65) Prior Publication Data

US 2006/0261574 A1    Nov. 23, 2006

(51) Int. Cl.
*B08B 21/00* (2006.01)

(52) U.S. Cl. .................. 280/477; 340/431; 33/264

(58) Field of Classification Search ............... 280/477; 340/431; 33/264
See application file for complete search history.

(56) References Cited

U.S. PATENT DOCUMENTS

| | | | |
|---|---|---|---|
| 3,901,536 A | 8/1975 | Black | |
| 4,552,376 A | 11/1985 | Cofer | |
| 5,461,471 A * | 10/1995 | Sommerfeld | ................... 356/3 |
| 5,951,035 A | 9/1999 | Phillips, Jr. et al. | |
| 5,967,596 A | 10/1999 | Knoop | |
| 6,120,052 A | 9/2000 | Capik et al. | |
| 6,150,938 A | 11/2000 | Sower et al. | |
| 6,176,505 B1 | 1/2001 | Capik et al. | |
| 6,178,650 B1 | 1/2001 | Thibodeaux | |
| 6,209,902 B1 | 4/2001 | Potts | |
| 6,222,457 B1 | 4/2001 | Mills et al. | |
| 6,259,357 B1 * | 7/2001 | Heider | ....................... 340/431 |
| 6,386,572 B1 | 5/2002 | Cofer | |
| 6,480,104 B1 * | 11/2002 | Wall et al. | ................... 340/431 |
| 6,801,125 B1 | 10/2004 | McGregor et al. | |
| 6,827,363 B1 | 12/2004 | Amerson | |
| 6,900,724 B2 * | 5/2005 | Johnson | ....................... 340/431 |
| 6,995,662 B2 * | 2/2006 | Wortsmith | .................. 340/435 |
| 7,057,498 B1 * | 6/2006 | Cook et al. | .................. 340/431 |
| 7,243,431 B2 * | 7/2007 | Godwin | ....................... 33/264 |
| 2004/0251659 A1 | 12/2004 | Amerson | |
| 2006/0267745 A1 * | 11/2006 | Larson | ....................... 340/431 |

* cited by examiner

*Primary Examiner*—Kevin Hurley
(74) *Attorney, Agent, or Firm*—Etherton Law Group, LLC

(57) ABSTRACT

The present invention is a laser-guided alignment apparatus for aligning various trailer hitches to a vehicle. The alignment apparatus can align trailers with either a bumper ball hitch, a gooseneck hitch, or a fifth-wheel hitch. The alignment apparatus of the present invention uses lasers that produce beams of light that produce reflecting points which are reflected on a target. These various reflecting points are aligned to indicate proper alignment of a trailer to a vehicle.

5 Claims, 5 Drawing Sheets

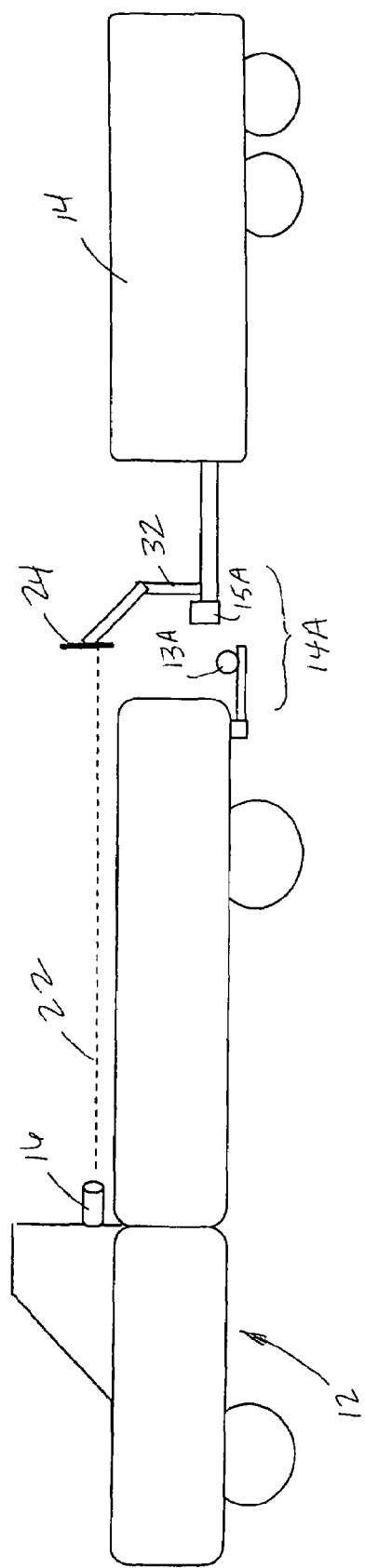
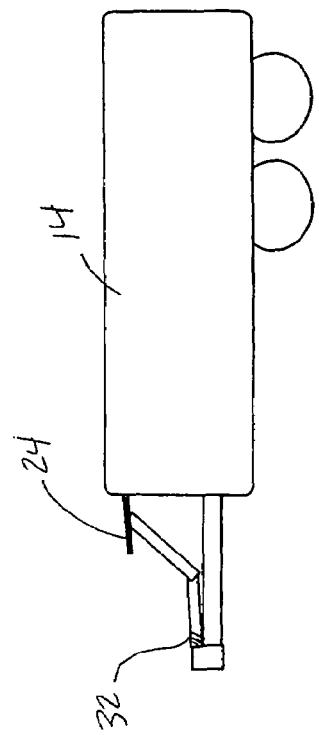
FIG. 2
FIG. 2A

LASER GUIDED TRAILER ALIGNMENT SYSTEM

FIELD OF INVENTION

This invention relates to a device that assists a user in positioning a vehicle next to a trailer so that the trailer's hitch is properly aligned and can be easily connected to the vehicle. This invention particularly relates to a laser guided alignment apparatus that aligns a vehicle to trailers with either a bumper ball hitch, a gooseneck hitch, or a fifth-wheel hitch.

BACKGROUND

There are numerous different hitches that are used to attach a trailer to a vehicle to enable the vehicle to tow the trailer. A few popular hitches include a "bumper ball hitch," a "gooseneck hitch," and a "fifth-wheel hitch." A bumper ball hitch comprises a ball attached to the bumper of the vehicle that fits within a corresponding socket located on a trailer. A gooseneck hitch also uses a ball located on a vehicle to engage a socket mounted on the trailer. But, the ball is mounted on the body of the vehicle, typically the bed of a pick-up truck, as opposed to the vehicle's bumper.

A fifth-wheel hitch is similar to a gooseneck hitch in that the section of the hitch attached to the vehicle is placed within the center of the truck bed and this section of the hitch includes a receiver (or other type of joint) that fits into a pin located on the section of the hitch attached to the trailer. But, a fifth-wheel hitch is different from a gooseneck and bumper ball hitch because it includes a large mounting mechanism that elevates the receiver (or other type of joint) above the bed of the truck.

All of these hitches have certain advantages and disadvantages and are typically used with certain trailers to perform specific tasks. For example, while a bumper ball hitch is excellent for towing a boat on a trailer, it isn't always appropriate to tow a large camper. Conversely, while a fifth-wheel hitch is an excellent choice to tow a large trailer such as a camper or RV, it usually won't function well to tow a boat. Therefore, a user might use a single vehicle to tow various trailers that have different hitches and have a bumper ball and a gooseneck or fifth-wheel hitch attached to the same vehicle to accommodate all of his towing needs.

One of the biggest problems associated with each of these hitches (bumper ball, gooseneck, and fifth-wheel) is properly aligning the ball with the socket (or the pin with the receiver for fifth-wheel hitch). The vehicle must be perfectly positioned so that the ball is located directly under the socket. Once aligned, the socket is lowered to engage the ball. Unfortunately, positioning the vehicle in the precise location to place the ball directly under the socket is very difficult, as the ball and socket are usually obstructed from a user's view. If the user fails to align the ball with the socket, the vehicle or trailer can be damaged if the socket or ball strikes the surface of the vehicle or trailer. This type of damage is particularly common with a bumper ball hitch and can result in a bent or punctured bumper.

To prevent vehicle damage and to help align the ball and socket, some users enlist the help of another person who stands behind the vehicle and directs the user to move either forward or backward and left or right until the ball is located directly under the socket. But, this method requires that another person be available and willing to help the user. Additionally, this method isn't practical at night because the other person must have a clear view of the ball and socket, which are not easy to see in the dark.

Other users will attempt to get as close as they can, then park the vehicle and walk to the bed or bumper to see how close they got. The user will then get back in the vehicle and reposition it based upon the results of the first attempt. This method usually takes several attempts at aligning the ball and socket before it is successful.

Alignment devices have been developed to enable a user to align the ball and socket by himself, and some of these devices function in the dark of night. But these devices have drawbacks, the biggest of which is that each particular alignment device is configured to be used with a specific style of hitch. Because each alignment device is capable of aligning only a specific style of hitch, a user can only use the alignment device for one type of hitch (i.e., a device that aligns a vehicle to a trailer with a bumper ball hitch would be useless to align the vehicle with a trailer that has a gooseneck hitch). Thus, if a user wanted to tow two trailers with two different hitches, he would have to use two separate alignment devices.

Another drawback of known alignment devices is that they only function well when the vehicle is extremely close to the trailer. Specifically, certain known alignment devices only begin to function when the vehicle is a few feet away from the trailer. This can cause the driver to hit the trailer with the vehicle while attempting to get the alignment device "in range" to function.

Therefore, it is an object of the present invention to provide a trailer alignment device that can be used to align a vehicle with trailers that have either a bumper ball, gooseneck, or fifth-wheel hitch that begins to assist the driver in aligning the vehicle with the trailer when the vehicle is several yards away from the trailer. It is also an object of the present invention to provide an alignment apparatus that functions well in the dark.

SUMMARY OF THE INVENTION

The present invention is an alignment apparatus that can be used to align a vehicle with a trailer that has a bumper ball hitch, a gooseneck hitch, or a fifth-wheel hitch. The device uses several lasers that emit light which is reflected by a target. One of the lasers is a center laser attached to the vehicle that emits a line of laser light rearward towards the trailer which strikes a target attached to the trailer to form a first reflecting point on the target. Each of two other lasers are mounted on sides of the vehicle and each emits a laser beam diagonally towards the trailer. One of these lasers is used to align a trailer with a bumper ball hitch and the other is used to align a trailer with a gooseneck or fifth-wheel hitch. The target for a bumper ball hitch is attached to the trailer and the target for a gooseneck or fifth-wheel hitch is either a separate reflective member attached to the trailer hitch or the actual trailer hitch, which can function as a target if it has a sufficiently reflective surface.

To align a vehicle with a trailer, the user will begin positioning the vehicle near a trailer with any of the hitches described above and turn on the lasers. The user will then use the reflected beam produced by the center laser to act as a guide that indicates the alignment of the vehicle to the trailer with respect to the left and right sides of the vehicle and trailer. The user moves the vehicle left to right as he backs it up to place the laser beam emitted from the center laser directly in the middle of a target or hitch mechanism to indicate that the vehicle is properly aligned with respect to the left and right sides of the trailer. At this point, the user knows the vehicle is properly aligned with the hitch with respect to the left and right sides of the trailer and vehicle. The user will continue to backing up while keeping the reflected laser beam in the center of the target. When the user is near the trailer, the user will slow down and begin to look for one of the flashing beams to appear on the target that is produced by one of the side lasers. The user then carefully backs up the vehicle until the flashing beam of light from the side laser is directly above or below the steady beam of light emitted from the center laser. When these two laser beams are aligned, the user knows the ball and socket (or pin and receiver for a fifth-wheel hitch) are aligned as the ball is directly underneath the socket.

BRIEF DESCRIPTION OF THE DRAWINGS

FIG. 2 is a side view of a truck using the alignment apparatus of the present invention to align a vehicle to a trailer with a bumper ball hitch;

FIG. 2A is a side view of a trailer with a bumper ball hitch having the target in a stored position;

DETAILED DESCRIPTION OF THE INVENTION

Figure 1:
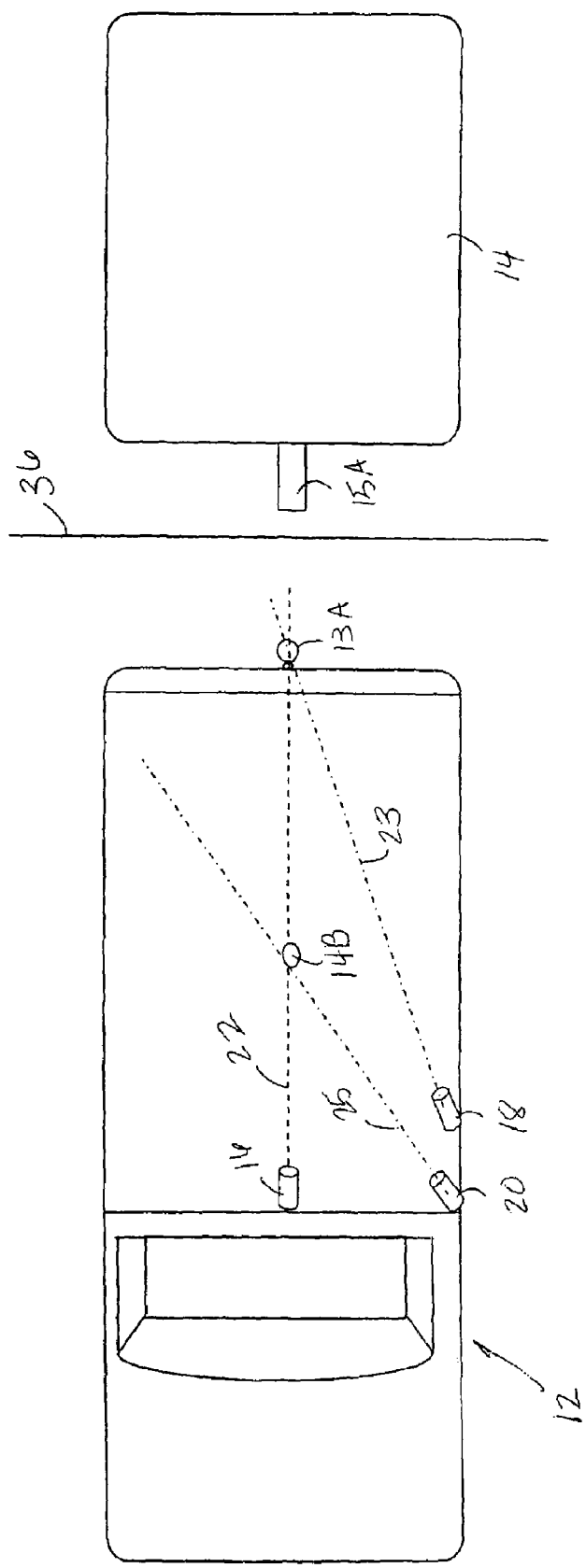
FIG. 1 is a top view of three lasers placed on a truck and their respective light paths.

The present invention is an alignment apparatus that aligns a vehicle with a trailer for towing. The alignment apparatus can align a vehicle 12 to a trailer 14 that has either a bumper ball hitch 14A, a gooseneck hitch 14B, or a fifth-wheel hitch 14C. As is known in the art, each of these hitching mechanisms is comprised of two parts, one located on vehicle 12 which is typically a ball 13A-13B and another part located on trailer 14 which is typically a socket 15A-15B that engages ball 13A-13B. In the case of a fifth-wheel hitch, a pin 11 engages receiver 15C as opposed to a ball and socket. In practice, aligning ball 13A-13B and socket 15A-15B occurs upon the correct alignment of vehicle 12 to trailer 14 and the phraseology of "aligning the vehicle 12 to trailer 14" is the same as "aligning the hitching mechanism" or "aligning ball 13A-13B to socket 15A-15*b* (or aligning pin 11 to receiver 15C") as used throughout.

The alignment apparatus is comprised of three lasers 16, 18, and 20 that project laser beams 22, 23 and 25 rearwards towards a target 24 which reflects the laser beams 22, 23, and 25. Specifically, laser beams 22, 23, and 25 strike target 24 and form reflecting points 26, 28, and 30 which are aligned to indicate the correct alignment of vehicle 12 to trailer 14 as discussed below. Lasers 16, 18, and 20 are preferably low-powered lasers emitting red light, examples of which are Helium-Neon lasers with a wavelength of 632 nm or semiconductor lasers with a wavelength in the range of 600-800 nm. Reflecting points 26, 28, and 30 are bright enough to be seen by a user who is several feet away from them. Therefore, the user can begin the aligning process as soon as reflecting points 26, 28, and 30 strike target 24 while vehicle 12 is still several feet (or yards) away from trailer 14." In addition to lasers, any type of light emitting device can be used and fall within the scope of the present invention such as spotlights, such as incandescent lamps, halogen lights, and any other type of light emitting device(s) capable of projecting beams of light that strike target 24.

As shown in FIG. 1, lasers 16, 18, and 20 are attached to vehicle 12 (preferably a pick-up truck or a truck with a bed) to project light rearwards towards trailer 14. Specifically, laser 16 is mounted on vehicle 12 along a center line equidistant from the vehicle's sides and lasers 18 and 20 are mounted on one side of the vehicle. Alternatively, lasers 18 and 20 could be mounted on opposite sides. Laser 16 is used to center vehicle 12 to trailer 14 with respect to having ball 13A-13B (or pin 11) and socket 15A-15B (or receiver 15C) aligned horizontally, and lasers 18 and 20 are used to ensure that ball 13A-13B (or pin 11) is directly underneath socket 15A-15B (or receiver 15C) with respect to moving vehicle 12 forwards or rearwards. Lasers 16, 18, and 20 can be controlled by any known means, but in the preferred embodiment, an electronic control panel is located within vehicle 12 to enable the user to control the operation of alignment apparatus 10.

Before use, alignment apparatus 10 should be calibrated by the user. Alignment apparatus 10 is calibrated by first mounting laser 16 in the center of the vehicle next to the cab and aiming laser 16 so that it projects the near horizontal beam 22 that crosses approximately one inch over the center of the rear end of vehicle 12. This provides a beam 22 that is now directly above and aligned with any type of ball or receiver that is mounted to vehicle 12 (i.e. bumper ball hitch 14A, a gooseneck hitch 14B, or a fifth-wheel hitch 14C). On a bumper ball hitch 14A, a target 24 is preferably mounted to trailer 14. Target 24 is adjusted so that it is higher than the tailgate or rear end of vehicle 12 so that the face of target 24 is parallel to the front of trailer 14 and so that the vertical center of target 24 is directly above the center of bumper ball hitch 14A. This is easily done by using plumb bob or similar tool. Trailer 14 is then positioned so that socket 15A is directly above ball 15A enabling bumper ball hitch 14A to be connected. Laser 18 or 20 is then adjusted so that the reflecting point 28 or 360 is positioned in the center of target 24 above or below reflecting point 26. This alignment process is completed for each type of trailer 14 attached to vehicle 12. But, neither a gooseneck hitch 14B nor a fifth-wheel hitch 14C requires target 24 as the hitch 14-B and 14C can function as a target if its surface is reflective.

While the preferred embodiment contemplates that laser 18 is used to align a bumper ball hitch 14A and laser 20 is used to align a gooseneck hitch 14B or fifth-wheel hitch 14C, other combinations could be used and fall within the scope of the present invention. For example, laser 18 could be used to align gooseneck hitch 14B and fifth-wheel hitch 14C while laser 20 could be used to align bumper ball hitch 14A.

Once calibrated, laser 16 emits laser beam 22 towards target 24 in a straight line parallel to vehicle 12's side portions to form reflecting point 26. When reflecting point 26 is positioned in the center of target 24, vehicle 12 and trailer 14 are properly aligned along a horizontal axis 36 indicating that the center points of vehicle 12 and trailer 14 are aligned so that ball 13A-13B (or pin 11) and socket 15A-15B (or receiver 15C) are directly across from one another. It is important to note that the user can observe reflecting point 26 from several feet away and can thus begin the alignment feet while vehicle 12 and trailer 14 are several feet, if not yards apart from each other. Additionally, vehicle 12 and trailer 14 can be aligned at various angles.

The user then positions either reflecting point 28 or 30 directly above or below reflecting point 26 by moving vehicle 12 forwards or rearwards to indicate that ball 13A-13B (or pin 11) is directly underneath socket 15A-15B (or receiver 15C). In the preferred embodiment, laser beam 22 produced by laser 16 is a continuous beam of light, while the laser beams 23 and 25 produced by lasers 18 and 20 are pulsed beams of light to help the user distinguish them from the continuous beam produced by laser 16. The use of alignment apparatus 10 for hitches 14A, 14B, and 14C will now be explained in detail.

Aligning Vehicle 12 to a Trailer 14 Having a Bumper Ball Hitch 14A.

As shown in FIGS. 2 and 2A, bumper ball hitch 14A comprises ball 13A mounted to a bumper that engages a socket 15A located on trailer 14. Additionally, target 24 is a separate device attached to trailer 14 in the preferred embodiment. Preferably, target 24 is a reflective panel mounted on a spring-mounted base 32 and is moved from a stored position shown in FIG. 2A to an operating position for use as shown in FIG. 2. Alternatively, target 24 can be stationary if desired.

Once target 24 is in the operating position as shown in FIG. 2, the user moves vehicle 12 in front of trailer 14 to begin the alignment process. Laser 16 is turned on and laser beam 22 is projected rearwards towards target 24 so that the user can position reflecting point 26 in the center of target 24 indicating bumper ball hitch 14A is properly aligned on horizontal axis 36. To assist the user in visually spotting reflecting point 26 on target 24, target 24 can include a set of lines 34 or other markings that indicate the correct location of the center of target 24. Reflecting point 26 is positioned in the middle of the target 24 by moving vehicle 12 left or right until reflecting point 26 is positioned in the center of target 24 indicating proper alignment on horizontal axis 36.

Next, the user moves vehicle 12 forward and rearward to position ball 13A directly underneath socket 15A to complete the alignment process. As shown on FIG. 5, reflecting point 28 appears on the side of target 24 as ball 13A moves closer to socket 15A. The user moves vehicle 12 until reflecting point 28 is directly above reflecting point 26 as shown on FIG. 6. In the preferred embodiment, laser beam 23 is pulsed to assist the user in distinguishing reflecting point 28 from reflecting point 26. Once reflecting point 28 is directly above reflecting point 26 as shown in FIG. 6, ball 13A is directly underneath socket 15A and the alignment process is complete.

Aligning Vehicle 12 to a Trailer 14 Having a Gooseneck Hitch 14B.

Figure 3:
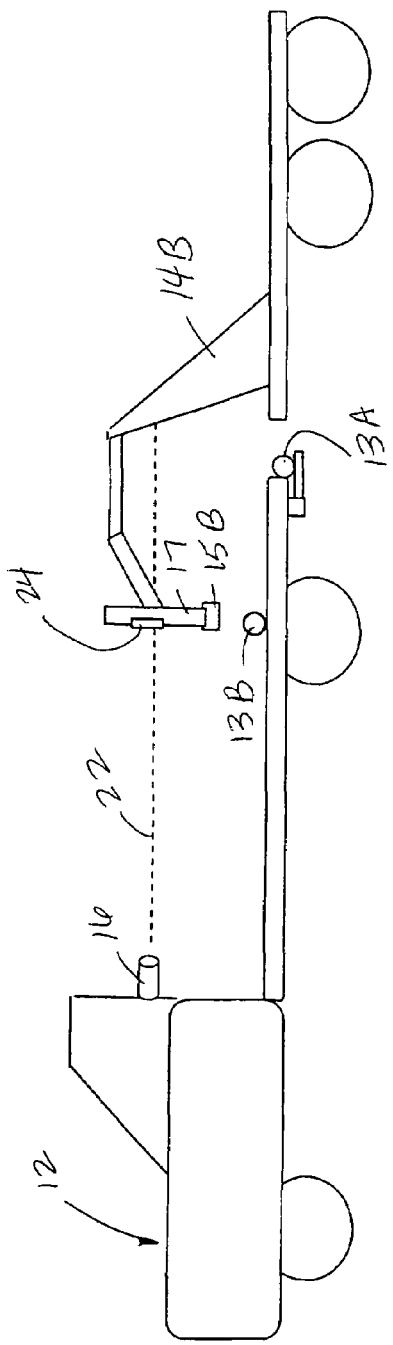
FIG. 3 is a side view of a vehicle using the alignment apparatus of the present invention to align the vehicle to a trailer with a gooseneck hitch.

As shown in FIG. 3, gooseneck hitch 14B includes ball 13B mounted on the center line of vehicle 12 to engage a corresponding coupler or pipe 17 that defines socket 15B attached to trailer 14. Target 24 is attached directly to gooseneck hitch 14B on pipe 17 as shown in FIG. 3. Target 24 can include a reflecting piece of material attached directly to gooseneck hitch 14B. Alternatively, pipe 17 can function as target 24 if it is constructed from a reflective material.

Figure 7:
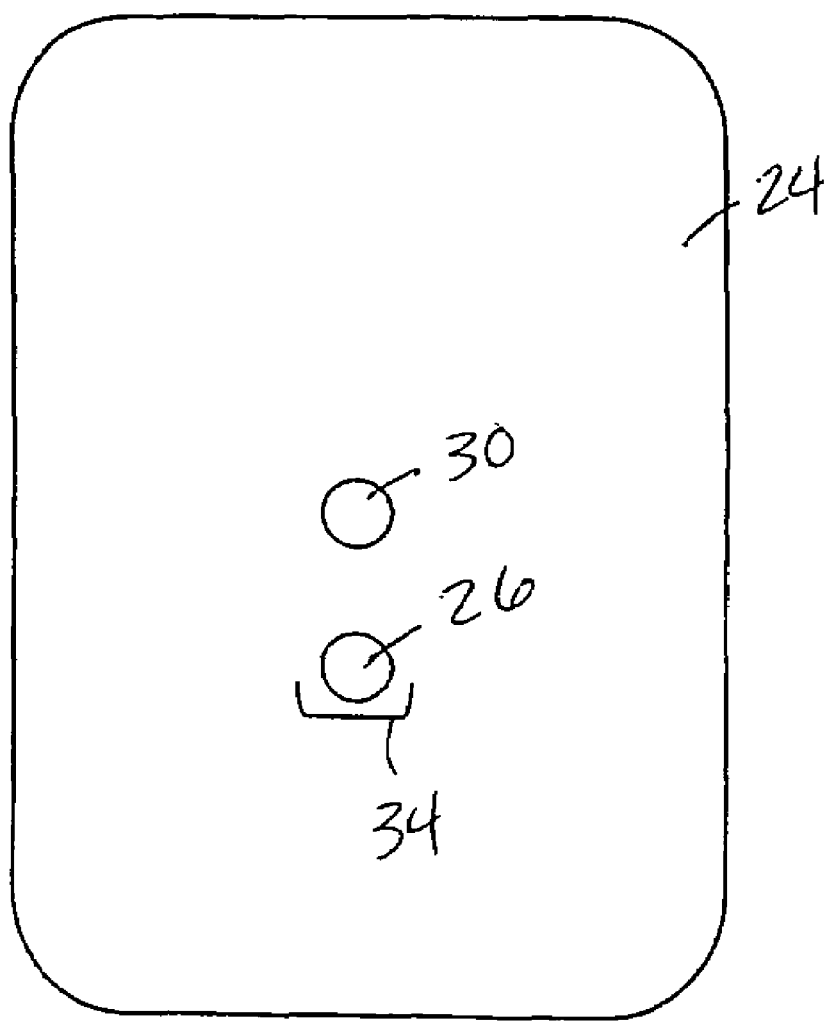
FIG. 7 is a view of the target with two reflecting points indicating that the vehicle is properly aligned with the trailer with a gooseneck hitch or a fifth-wheel hitch.

The procedure for aligning gooseneck hitch 14B is similar to the one described for bumper ball hitch 14A. But, instead of using laser 18, laser 20 is used which is also preferably pulsed to distinguish reflecting point 30 from reflecting point 26. Vehicle 12 is aligned on the horizontal axis 36 by placing reflecting point 26 within the center of target 24 by moving vehicle 12 left and right. Then, the user moves vehicle 12 forward or backward until reflecting point 30 produced by laser 18 is positioned directly above reflecting point 26 indicating that gooseneck hitch 14B is properly aligned as shown in FIG. 7.

Aligning Vehicle 12 to a Trailer 14 Having a Fifth-Wheel Hitch 14C.

Figure 4:
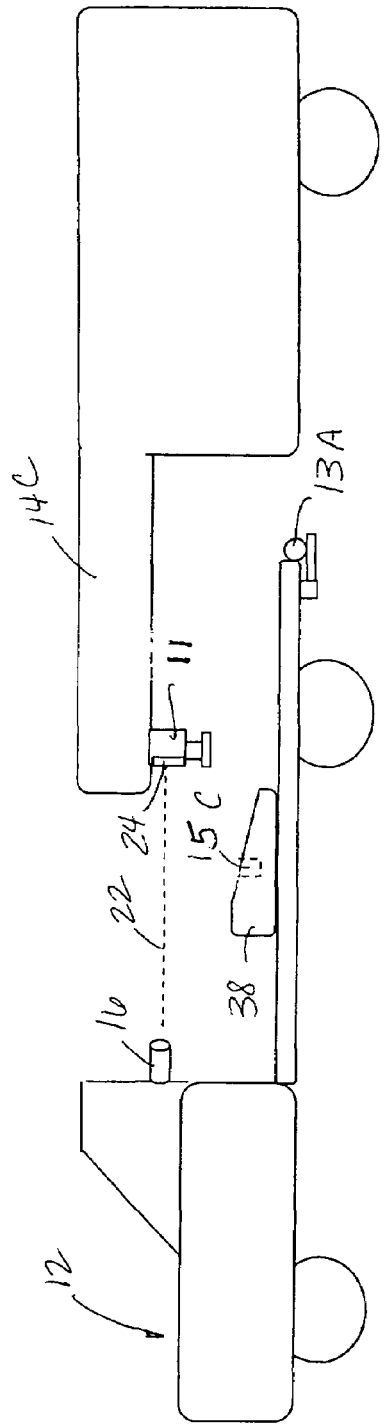
FIG. 4 is a side view of a vehicle using the alignment apparatus of the present invention to align the vehicle to a trailer with a fifth-wheel hitch.

As shown in FIG. 4, fifth-wheel hitch 14C is includes pin 11 mounted on a base 38 which is on the center of vehicle 12. Pin 11 engages receiver 15C located on trailer 14 to secure trailer 14 to vehicle 12. As is known in the art, other joint mechanisms exist for fifth-wheel hitches besides pin 11 and receiver 15C and any of them can be used with the present invention. Examples of which include using ball 13A-13B instead of pin 11 to engage receiver 15C.

In use, reflecting point 26 is aligned within the center of target 24 in the same manner as described above. In the preferred embodiment, laser 20 can also be used to align a fifth-wheel hitch 14C and is used to project laser beam 25 (preferably pulsed) which produces reflecting point 30 on target 24 that is either directly attached to the fifth-wheel hitch 14C or part of fifth-wheel hitch 14C. Alternatively, another laser can be mounted to one of the sides of vehicle 12 to be used in an identical manner as laser 20 if the user desired to have a single laser dedicated for the alignment of fifth-wheel hitch 14C. Vehicle 12 is then moved forward or backward to position reflecting point 30 directly above reflecting point 26 as shown in FIG. 7 indicating the proper alignment of fifth-wheel hitch 14C.

In alternative embodiments, the reflecting points 26-30 can be arranged in other configurations to indicated alignment. For example, instead of aligning reflecting points 26 and 28 (or reflecting point 30) on a vertical line as shown, reflecting points 26 and 28 could be aligned on a horizontal plane. Additionally, reflecting points 28 and 30 may be below reflecting point 26; reflecting points 28 and 30 may cover reflecting point 26; or reflecting points 28 and 30 may be at another pre-defined distance or at a relative angle to reflecting point 26.

Figure 5:
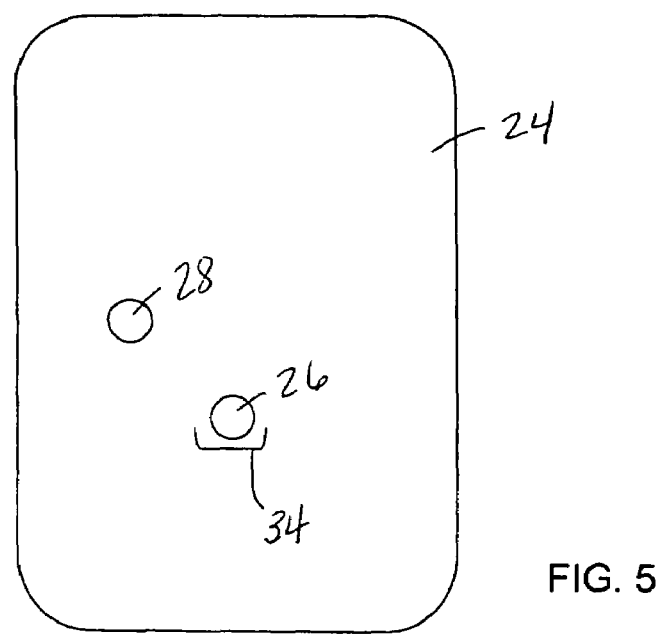
FIG. 5 is a view of the target with two reflecting points indicating that the vehicle is not properly aligned with the trailer.
Figure 6:
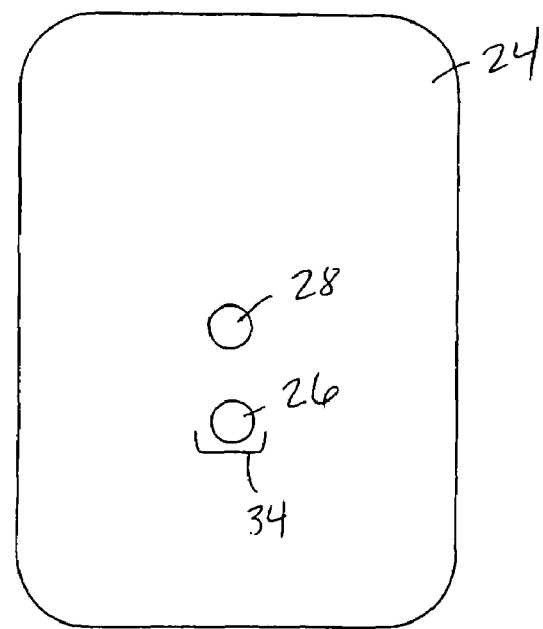
FIG. 6 is a view of the target with two reflecting points indicating that the vehicle is properly aligned with the trailer with a bumper ball hitch.

As used throughout the specification, the term "aligned" means that the reflecting points are located directly above one another as shown in FIGS. 5-7. But, the present invention also contemplates that various other markings could be used to indicate the correct placement of reflecting points 26, 28, and 30 at other locations on target 24. Finally, any other types of attachment mechanisms besides ball 13A-13B (or pin 11) and socket 15A-15B (or receiver 15C) can be used for any of the hitching mechanisms 14A-14C discussed within.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

We claim:

1. A method of aligning a vehicle to a trailer that has a hitch, the method comprising:

a) providing a vehicle having two sides, a center line equidistant between the two sides, and front and rear ends;
b) providing a trailer having front and rear ends and a hitch;
c) positioning the vehicle so that the rear end of the vehicle is adjacent to the front end of the trailer;
d) projecting a first beam of light parallel to the center line which strikes a target to form a first reflecting point;
e) projecting a second beam of light that will strike the target to form a second reflecting point; and
f) moving the vehicle so that the second reflecting point is aligned with the first reflecting point to indicate the alignment of the vehicle with the trailer and hitch.

2. The method according to claim 1 wherein the first and second beams of light are laser beams.

3. The method according to claim 1 wherein the first beam of light is continuous and the second beam of light is pulsed.

4. The method according to claim 1 wherein the first and second reflecting points are aligned when the second reflecting point is located on the same vertical axis as the first reflecting point.

5. The method according to claim 1 wherein the hitch is a gooseneck hitch.

* * * * *